Feb. 22, 1927.
W. M. TOMPKINS
1,618,692
INTERNAL COMBUSTION ENGINE
Filed Aug. 14, 1924   3 Sheets-Sheet 3
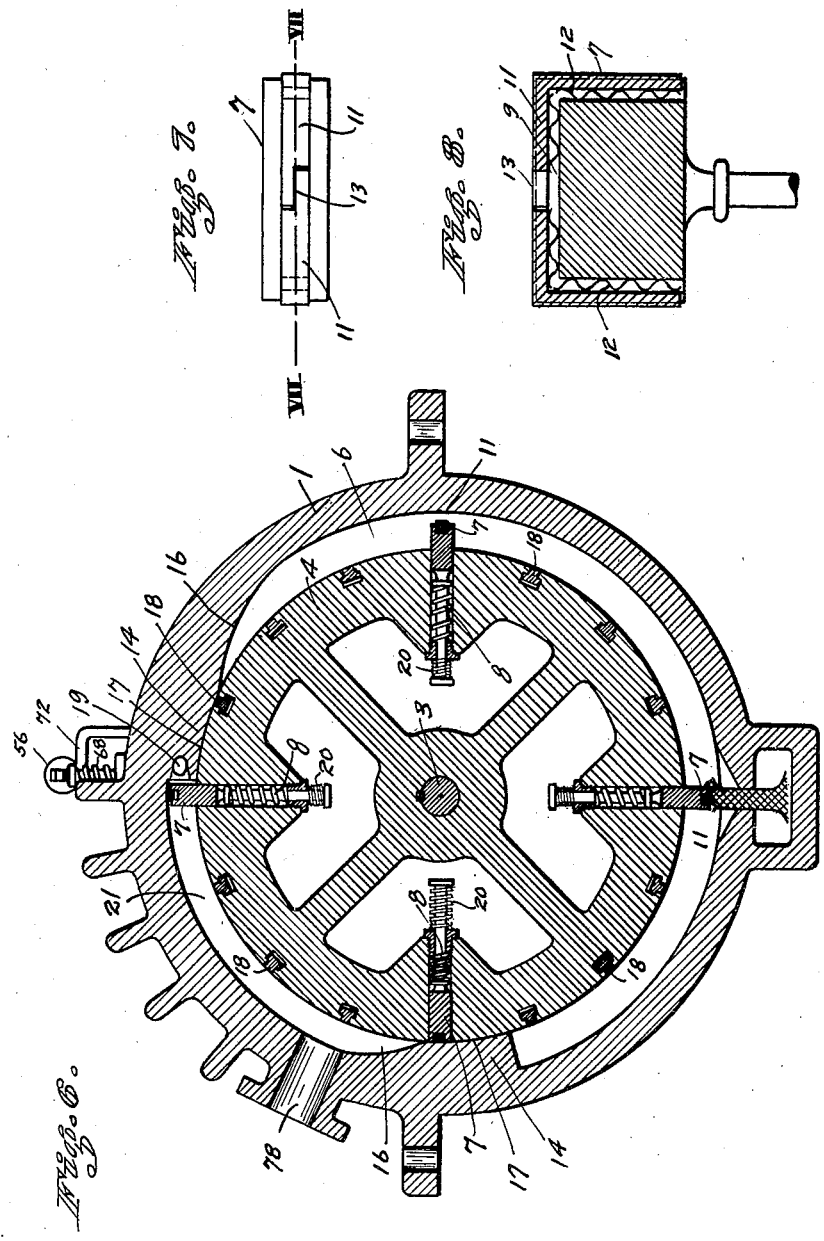
Inventor
WILLIS M. TOMPKINS
By
Attorneys.

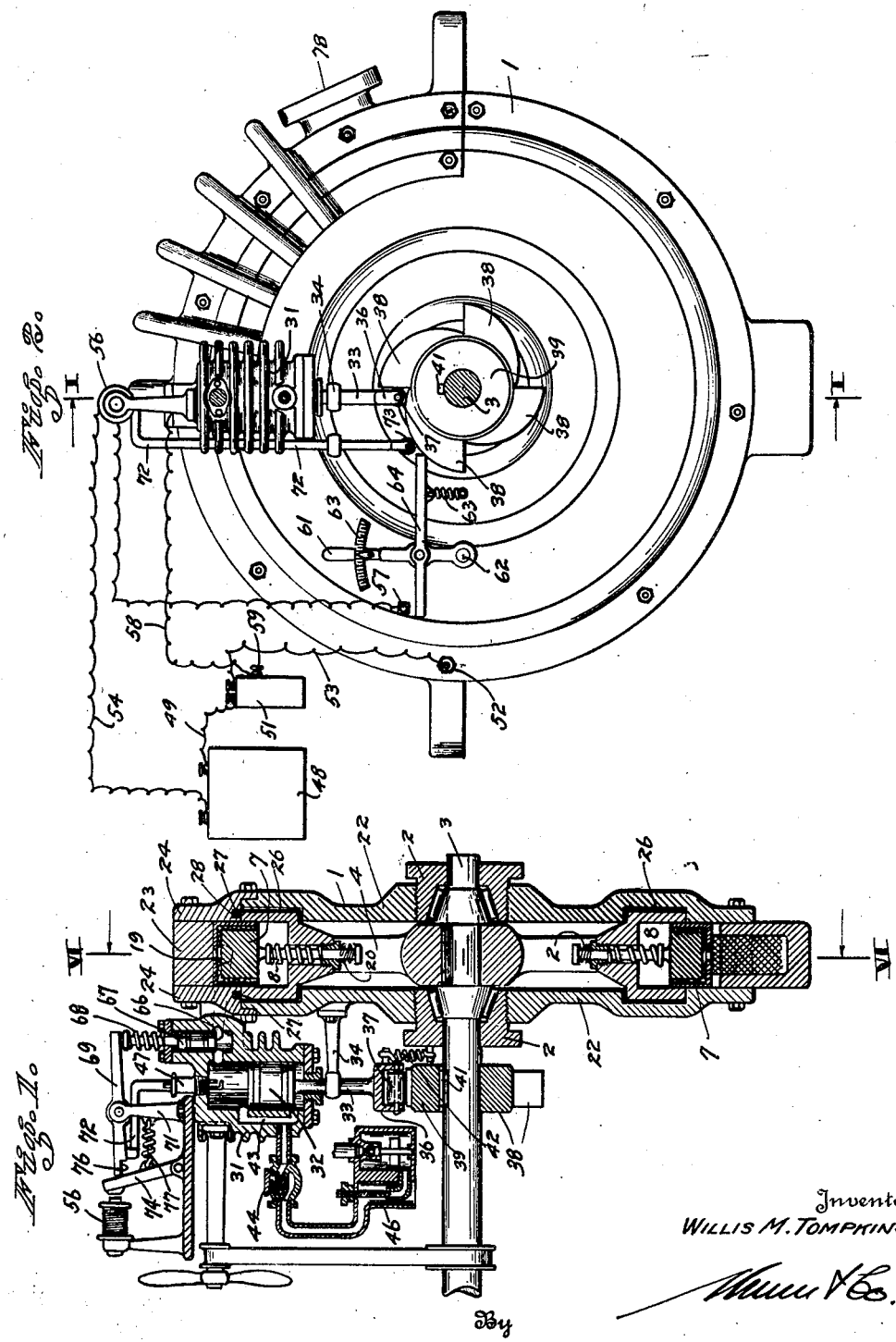

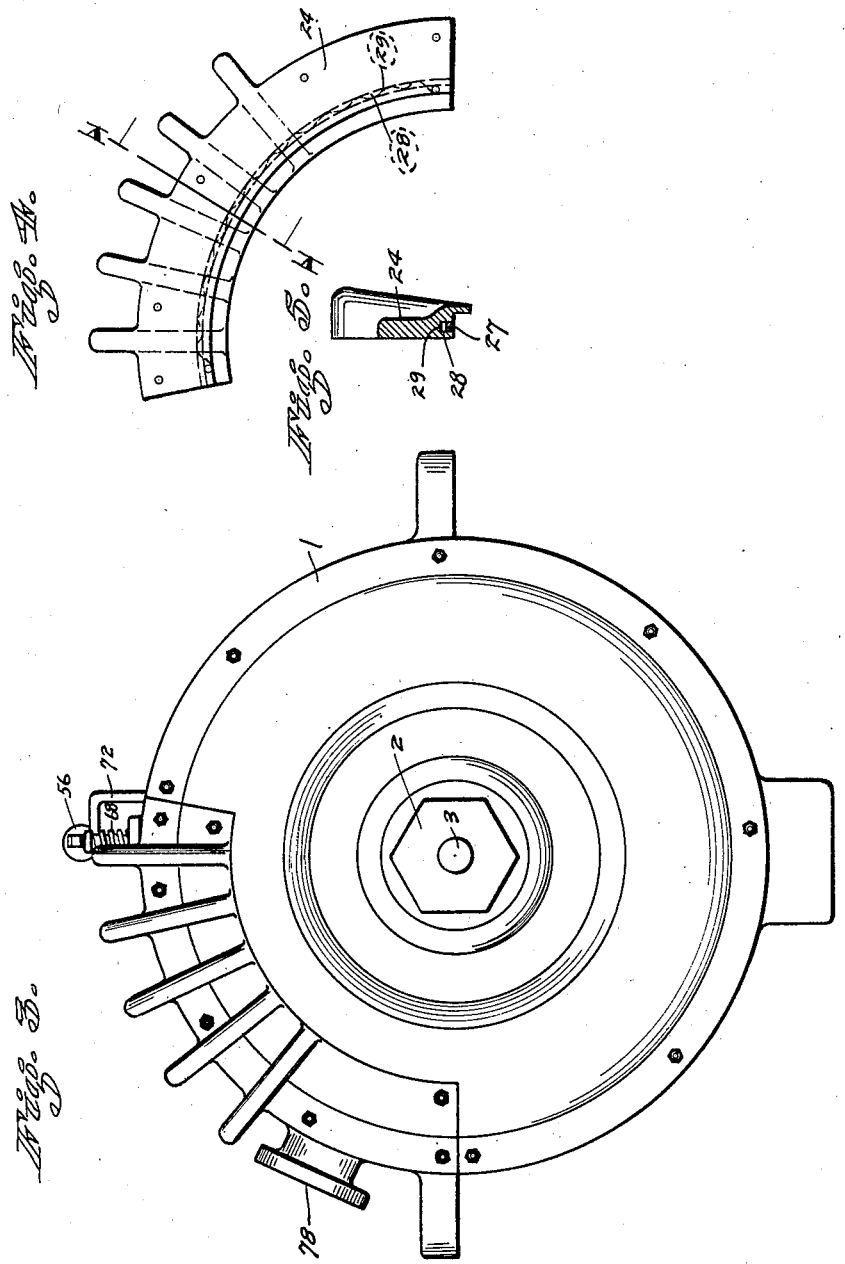

Patented Feb. 22, 1927.

1,618,692

UNITED STATES PATENT OFFICE.

WILLIS M. TOMPKINS, OF LOS BANOS, CALIFORNIA.

INTERNAL-COMBUSTION ENGINE.

Application filed August 14, 1924. Serial No. 732,061.

The present invention relates to improvements in internal combustion engines and has particular reference to a rotary engine. The engine described in this specification is an improvement on the engine described in my patent of December 5, 1916, on a rotary internal combustion engine.

The principal object of the invention described herein is to provide certain improvements in feeding a charge into the expansion chamber of the rotary engine. In this connection it is proposed to cause a charge to be compressed and to be exploded in a separate chamber outside of the expansion chamber of the engine and to allow the exploded charge to enter the expansion chamber for driving a radial piston extending from the rotor.

It is further proposed to provide a simple means for comprising an exploded charge at the proper time and for causing compression and explosion to take place in timed relation to the rotation of the rotor.

It is further proposed to provide a definite valve control between the combustion chamber in which the charge is exploded and the expansion chamber and to actuate this control by the same means that causes the compression and the explosion so that the three different events, i. e., compression, explosion and feeding into the expansion chamber always occur in timed relation to one another. It is further proposed to provide a rotary engine of a very simple form and to reduce the working mechanism of the same to a minimum. Other advantages and objects of my mechanism will appear as the specification proceeds.

The preferred form of my invention is illustrated in the accompanying drawings, in which Figure 1 shows a vertical longitudinal section taken along line I—I of Figure 2, Figure 2 a side view of the same as viewed from the left hand side of Figure 1, Figure 3 a side view of the engine as viewed from the opposite side, Figure 4 a detail view of a cover used for the expansion chamber, looking at the same from the inside, Figure 5 a section through the same taken along line V—V of Figure 4, Figure 6 a vertical section taken along line VI—VI of Figure 1, Figure 7 a top plan view of a radial piston used in my device, and Figure 8 a section through the same along line VIII—VIII of Figure 7. While I have shown only the preferred form of the invention, I wish to have it understood that various changes or modifications may be made within the scope of the claims hereto attached without departing from the spirit of the invention.

The stator or stationary element of my internal combustion engine is a cylindrical housing (1) in which is supported in bearings (2) a central shaft (3). The latter has keyed thereto the rotor (4) which is dimensioned to leave an annular passage (6) between its circumference and the inner wall of the housing. The rotor has a plurality of radially disposed pistons (7) mounted therein in symmetrical relation with springs (8) bearing on the same urging them in contact with the three walls of the cylinder.

The piston is preferably made in the form illustrated in Figures 7 and 8, that is, rectangular in cross-section and provided with a groove (9) extending from the two sides and the end of the piston in a continuous line, so that the two sections (11) of a piston ring disposed in the groove may be forced into contact with the three surrounding walls of the cylinder by means of springs (12) disposed in the bottom of the groove and arranged in such a manner as to force the two sections both endwise and sidewise. The two sections overlap in the central portion of the groove as shown at (13) so that by means of this arrangement the entire ring remains in contact with the three surrounding walls even if the two sections are slightly separated by the action of the spring.

The cylindrical housing is formed with two internal abutments (14) both of which offer a curved face (16) to the approaching piston so as to force the same inwardly and both of which have internal faces (17) joining the faces (16) which run parallel to and are in continuous contact with the rotor (4), air-tight contact being secured either by the piston (7) or by one of a plurality of packing elements (18) distributed over the circumference of the rotor. One of the abutments is formed with a perforation (19) which allows a charge to enter through the same into the expansion chamber (21) formed between the two abutments.

It will be observed that the distance of the inner wall of the cylinder from the center of the rotor is slightly less in the chamber (21) than in the remainder of the annular passage (6) so that the pistons (7) while contacting the inner wall of the cylinder in the expansion chamber do not contact the wall while travelling outside of the combustion chamber. The pistons are also provided with rebound springs (20) which prevent the pistons from projecting too far and which also lessen the impact of the piston on the cylinder wall in the expansion chamber.

The cylindrical housing is preferably made of two circular plates (22) fitting upon and bolted to a ring (23). Two sections (24) of the plates enclosing the expansion chamber (21) are rendered removable, and an airtight joint between the two removable sections and the rotor which extends in lateral recesses (26) in the cylindrical housing, is insured by the packing rings (27) disposed in internal grooves (28) in the sections (24) as illustrated in Figures 4 and 5 and forced into contact with the rotor by means of springs (29) disposed in the bottom of the grooves.

In the immediate vicinity of the intake (19) for the charge there is provided a second cylindrical housing (31) which latter is radially disposed relative to the main housing. A piston (32) of the form ordinarily used in reciprocating engines is arranged in the housing and provided with a connecting rod (33) rigidly secured thereto. The rod is vertically guided in a bracket (34) extending from the housing of the main cylinder, and terminates at its bottom end in a fork (36), between the two prongs of which is supported a roller (37). This roller rides on the cams (38) extending from a wheel (39) keyed to the shaft (3) as shown at (41).

In the device as designed in the present case, four cams are provided corresponding with the number of radial pistons in the main cylinder. Each of the cams occupies one-fourth of the circumference and while rising gradually in the direction of travel from zero to a point a considerable distance away from the wheel, it drops in a straight radial line so that in effect when the shaft (3) is rotated the piston (32) in the cylinder is caused to rise gradually until it reaches a maximum height, whereupon it is allowed to be returned to its lowest point immediately by a spring (42) provided for this purpose.

The cylinder (31) is formed with a passage (43) communicating with the inside of the cylinder at two distant points and also communicating through a check valve (44) with the carburetor (46) which latter offers no unusual features.

When the piston (32) is forced upwardly, a charge that has been introduced above the piston during the previous downward stroke is compressed, while at the same time a new charge enters the cylinder below the piston. On the downward stroke the piston drives the charge from the lower part of the chamber into the upper part of the chamber, the check valve (44) preventing a return of the charge into the carburetor.

In this manner a charge is compressed in the upper part of the cylinder (31) on every upward stroke of the piston (32).

This charge is ignited at the proper time by means of the spark plug (47). To properly time the sparkling of the spark plug, I use the device illustrated in Figure 2. The drawings show that the battery (48) is connected by means of the wire (49) to the coil (51), while the latter is connected to the ground (52) by means of the wire (53). The other side of the battery is connected through the wire (54) to the electro-magnet (56) and the latter is connected to the terminal (57) which is insulated from the ground. A high tension wire (58) connects the third terminal (59) of the coil (51) with the free electrode of the spark plug. A handle (61) is pivoted to the main cylinder as shown at (62) and its free end is adapted to ride over a scale (63) whereby its exact position may be determined. To this handle is pivoted a lever (64), one end of which rides on the cams (38) when the shaft (3) is rotated, while the other end is disposed in operative proximity to the terminal (57), with a spring (63) tending to close the contact.

It will be seen that in this manner as soon as the end of the lever (64) is actuated by one of the cams (38) a contact is established whereby a spark is caused to occur in the cylinder (31) and whereby at the same time the electro-magnet (56) is energized. The exact time for the tripping of the lever (64) can be adjusted by means of the handle (63) which may be swung backward or forward on the dial to retard or advance the spark respectively.

It will be noted that the lever (64) is actuated by the cam (38) before the piston (32) is allowed to move downward, in fact the latter piston will move upward after the spark has occurred and will thus force the exploded charge into the expansion chamber (21) through the passage (66) communicating with the perforation (19) in the main cylinder housing.

The latter passage is controlled by means of a plunger (67) which is normally held in inactive position by the spring (68) but which may be forced downwardly by means of the lever (69) pivoted in a stationary standard (71) and acted on at its free end by means of the rod (72) provided at its bottom with a roller (73) riding on the cam (38). This latter rod is disposed between the piston rod (33) and the lever (64) so that the motions of the rod (72) will follow those of the lever (64) and will precede those of the piston rod (33). The rod (72) rises to its uppermost height so as to close the valve for the passage (66) before the piston (32) has risen to its extreme height so that the valve is closed before compression has taken place.

As soon as the lever (69) is forced into the valve closing position it is locked in said position by means of the dog (74) which is pulled into a notch (76) by a spring (77). From this latch the lever is not released until the electrical circuit is closed, when the electro-magnet (56) will pull the dog (74) out of the notch (76) and will allow the spring (68) to open the valve as soon as the lever (72) leaves the cam (38). In this manner the valve will not open unless the electrical system works and the charge is properly exploded in the cylinder (31).

The operation of the device may be described as follows:

As viewed in Figures 1 and 2, the piston (32) is in its lowermost position, a charge has been introduced above the same on the previous downward stroke, the valve (67) is just about ready to close, and the lever (64) is still disconnected from the terminal (57). As the rotation of the shaft (3) continues the lever (64) is first actuated by the cam (38) whereby the electrical circuit is closed. At this time the valve (67) has been closed completely and the charge within the cylinder (31) is fairly well compressed.

Immediately after the occurrence of the spark, the valve (67) is allowed to open, since the rod (72) reaches the end of the cam while the piston (32) still keeps pushing upward and thereby forces the exploded charge into the passage (66) and through the perforation (19) into the expansion chamber (21) behind one of the pistons (7), which are arranged to be in the respective positions shown in Figure 6 at this time.

The exploded charge forces the piston (7) forward and causes the rotor to rotate. Before the piston (7) last acted on reaches the abutment (14) it uncovers the exhaust (78) and allows the gases to escape. In the meantime the shaft (33) has reached the end of the cam and has returned to the position indicated in Figure 2, causing the downward stroke of the piston during which a new charge is introduced in the chamber above the piston.

I claim:

1. In an internal combustion engine, a rotary element, a stationary element forming an expansion chamber with the former, means for admitting a charge into the chamber and means for controlling the latter means comprising a valve mounted for action by endwise motion and normally kept open, a lever bearing on the valve with one end thereof, means engaging the other end of the lever and actuated by the rotary element for periodically closing the valve, and means for allowing the periods of closure to be extended irrespective of the actuating means.

2. In an internal combustion engine, a rotary element, a stationary element forming an expansion chamber with the former, means for admitting a charge into the chamber and means for controlling the latter means comprising a valve mounted for action by endwise motion and normally kept open, a lever bearing on the valve with one end thereof, means engaging the other end of the lever and actuated by the rotary element for periodically closing the valve, means for automatically locking the lever in the valve closing position for extending the period of closure independently of the actuating means and electro-magnetic means rendered active by the rotary element at predetermined times for releasing the lever.

WILLIS M. TOMPKINS.